A. F. KELLOGG.
EXPOSURE IDENTIFICATION DEVICE FOR CAMERAS.
APPLICATION FILED SEPT. 10, 1914.
1,304,325.
Patented May 20, 1919.
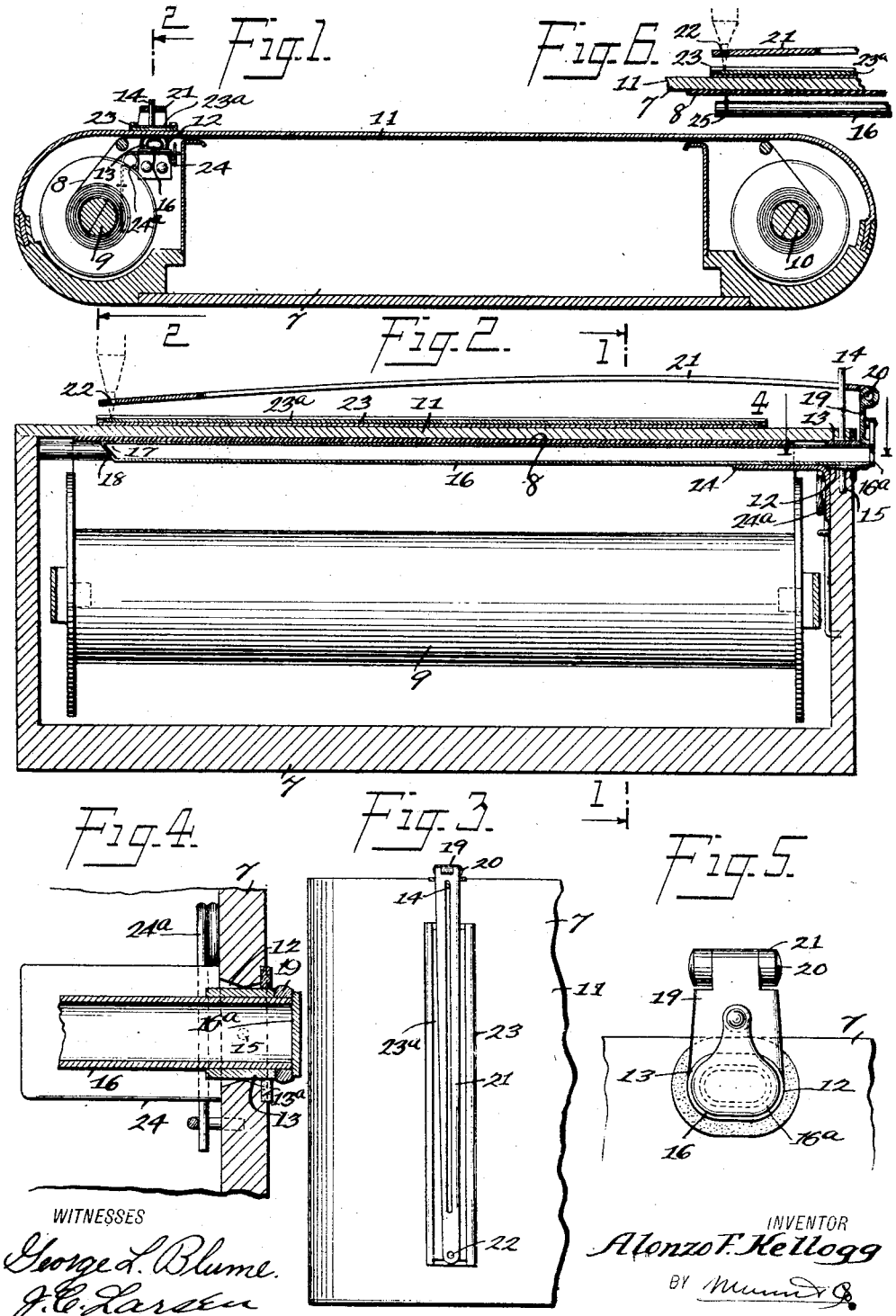
WITNESSES
INVENTOR
Alonzo F. Kellogg
ATTORNEYS

UNITED STATES PATENT OFFICE.

ALONZO FRANCIS KELLOGG, OF PORTAGE, WISCONSIN.

EXPOSURE-IDENTIFICATION DEVICE FOR CAMERAS.

1,304,325. Specification of Letters Patent. Patented May 20, 1919.

Application filed September 10, 1914. Serial No. 861,029.

*To all whom it may concern:*

Be it known that I, ALONZO F. KELLOGG, a citizen of the United States, and a resident of Portage, in the county of Columbia and State of Wisconsin, have invented certain new and useful Improvements in Exposure-Identification Devices for Cameras, of which the following is a specification.

My invention relates to cameras, more especially to those employing sensitized film, and the main object thereof is to provide means for writing a record upon a film at the time of exposure in order to identify the negative after the development of the exposed film; a further object is to provide such a device which produces the desired record upon the conventional films now in use, and without any alteration thereto or to the development thereof; a further object is to provide such a device which eliminates the use of a "window" to make the record; a further object is to provide such a device which makes the record through a small opening admitting a ray of light and the medium carrying the opening being moved to move the ray of light to make the record; a further object is to provide such a device which may employ a pin or pencil point as a substitute for the ray of light; a further object is to provide an element upon the exterior of the camera for guiding the recording device; and further objects are to provide such devices which are simple in construction and use, positive of result, permit of records the length of the negative and upon several lines, and are comparatively inexpensive.

My invention is fully described in the following specification, of which the accompanying drawings form a part, in which the separate parts are designated by the same reference characters in each of the views, and in which:—

Figure 1 is a longitudinal section taken through a film camera provided with my invention;

Fig. 2 is an enlarged section taken on the line 2—2 of Fig. 1;

Fig. 3 is a fragmentary, exterior, view of the camera, showing a portion of my invention;

Fig. 4 is an enlarged section taken on the line 4—4 of Fig. 2;

Fig. 5 is an exterior, end, view of a fragment of the camera, and of my invention thereon; and Fig. 6 is a fragmentary section, similar to Fig. 2, but showing a modification thereover.

In Figs. 1 to 5, inclusive, I have shown a present preferred form of embodiment of my invention, arranged within the case 7 of a camera having the roll film 8 mounted upon the rollers 9 and 10 and moved in the usual manner, the camera shown having a removable back 11.

In one edge, and at one end, of the case 7 I provide an opening 12 and in which is a small tube 13, or collar packed against the admission of light through said opening at $13^a$, pivoted in said case by means of pins 14 and 15, the former of which projects above the case 7, and I will make the connection between collar and case light-proof.

Slidably mounted in the collar 13 is a tube 16 which is of such length as to extend across the interior of the case 7 and the said tube bears against the inner side of the film 8, being provided with a small aperture 17 at its end and upon the side bearing against the film, the extreme end being rendered light-proof by means of a closure 18 set at an angle of 45 degrees, whereby light passed through said tube will be reflected through the aperture 17 and upon the sensitized film, the interior of said tube being coated or treated to insure the reflection of rays of light admitted at the open, exterior, end which is normally covered by a closure $16^a$ of any suitable form.

The collar 13, exterior of the case 7, has a lug 19 secured thereto and provided with a pin 20 at its upper end serving as a pivot for a lever 21 which extends across the outside of the case directly over the tube 16, said lever being slotted for the greater part of its length and through which slot the pin 14 projects, and the outer end of the lever 21 has a hole 22 therethrough for the passage of the point of a pencil or pen, and it will be seen that, if the lever 21 be moved upon its pivot pin 14, the tube 16 is correspondingly moved, and said tube slides through the collar 13 when the lever 21 is moved longitudinally of its pivot 14.

Secured to the exterior of the case 7, beneath the normal position of the lever 21, is a flanged plate 23 extending almost entirely across the case 7 and adapted to receive a strip of paper 23ª upon which writing may be produced, or any other suitable record, and, in the movement of the pencil arranged in the lever end, over the paper strip in the plate 23, the free end of the tube 16, within the case 7 is correspondingly moved, thus moving the aperture 17 over the sensitized film, and the record inscribed on the surface of the case is duplicated upon the film, when developed, by the exposure of said film to the traveling ray of light through the aperture 17, but, as will be understood, it is not necessary to make visible marks on the strip of paper 23ª in the frame 23, as merely moving the lever produces the desired result within the case 7; however, the amateur photographer will be better guided in forming the record if he can see a line produced in the movement of the lever, and it is for such persons that the strip of paper is provided, and the pencil holding means at the lever end.

In order to insure the tube 16 against rotation within the collar 13, I prefer to make the same of some transverse configuration other than round, oval being shown in the drawings, and I also show a plate 24 beneath the tube 16 for maintaining the said tube in close juxtaposition with the film, this being insured by means of a spring 24ª, but the exact details of construction are subject to variation, as will be understood.

It will thus be seen that I provide means for producing a record, of any desired character, upon each exposure of a roll film, rendered visible in the development of said film, and transferred thereby to a print in the usual manner; it will also be seen that I produce the record upon the margin of a print, and across the entire width thereof, if desired, and I may also produce two or more lines of descriptive matter.

In Fig. 6 of the drawings I have shown a slight modification over the form described, in that I provide a pin or pencil point 25 in place of the light aperture in the tube 16, and I may make other changes in the details shown, within the scope of the following claims, without departing from the spirit of my invention, or sacrificing its advantages.

Having fully described my invention, what I claim as new, and desire to secure by Lettens Patent, is:—

1. An autographic recorder for cameras having a sensitized film therein, comprising a movable element exterior of the camera, and means, interior of the camera, for reproducing the movements of said element upon the surface of said film.

2. An autographic recorder for cameras having a sensitized film therein, comprising a movable lever on the exterior of said camera, and means within said camera actuated by said lever to register the movements thereof on said film.

3. An autographic recorder for cameras having a sensitized film therein, comprising a movable lever pivoted upon the exterior of said camera, a tube open at its outer end, the other end of which is closed and provided with an aperture upon the side adjacent the film, a movable cover for said open end and means for moving said tube to correspond to the movements of said lever.

4. An autographic recorder for cameras having a sensitized film therein, comprising a movable element upon the exterior of said camera, and means actuated thereby, within said camera, for directing a ray of light over said film to correspond to the movements of said movable element.

5. An autographic recorder for cameras having a sensitized film therein, comprising a movable element exterior of the camera adapted to receive a pencil, a removable strip of paper thereon adapted to have a legend written thereon by means of said pencil, and means, interior of the camera, for reproducing the movements of said element upon the surface of said film.

6. A camera casing inclosing a plate or film, in combination with means for exposing the plate or film to a light point within the casing, and means for controlling the movements of the light point.

7. A camera casing inclosing a plate or film, in combination with means for exposing the plate or film to a light point within the casing, and means for controlling from outside the casing the movements of the light point.

8. A camera casing inclosing a plate or film, in combination with means for exposing the plate or film to a light point within the casing, a freely movable stylographic device located outside the casing, and connections between said device and light point to duplicate in the latter the movements of the former.

9. A camera casing inclosing a plate or film, in combination with means for applying an inscription to the plate or film within the casing, a stylographic device outside the casing, and connections intermediate said stylographic device and inscription means to duplicate in the latter the movements of the former.

10. The combination, with a light box having a piece of sensitized material disposed therein, of a light pencil within the box for writing directly upon said material, a pencil without the box, means for operatively connecting said light pencil and pencil without the box together whereby said light pencil will execute the movements made by the pencil without the box.

In testimony whereof I have signed my name to this specification in the presence of two subscribing witnesses.

ALONZO FRANCIS KELLOGG.

Witnesses:
C. H. HALL,
CHAS. VESELY.

Copies of this patent may be obtained for five cents each, by addressing the "Commissioner of Patents, Washington, D. C."